(12) United States Patent
Keen

(10) Patent No.: US 7,954,982 B2
(45) Date of Patent: Jun. 7, 2011

(54) HIGH INTENSITY LIGHT REFLECTOR APPARATUS

(76) Inventor: Stephen B Keen, Elgin, TX (US)

( * ) Notice: Subject to any disclaimer, the term of this patent is extended or adjusted under 35 U.S.C. 154(b) by 272 days.

(21) Appl. No.: 12/437,804

(22) Filed: May 8, 2009

(65) Prior Publication Data

US 2009/0279303 A1 Nov. 12, 2009

Related U.S. Application Data

(60) Provisional application No. 61/051,613, filed on May 8, 2008.

(51) Int. Cl.
*F21V 7/18* (2006.01)
*F21V 19/02* (2006.01)

(52) U.S. Cl. .......................... 362/297; 362/805; 362/294

(58) Field of Classification Search .................. 362/278, 362/281, 285, 294, 297, 307, 296.03, 805
See application file for complete search history.

(56) References Cited

U.S. PATENT DOCUMENTS

| 4,078,169 A | * | 3/1978 | Armstrong | 362/805 |
| 4,460,942 A | * | 7/1984 | Pizzuti et al. | 362/307 |
| 5,025,356 A | * | 6/1991 | Gawad | 362/278 |
| 2001/0004320 A1 | * | 6/2001 | Wood | 362/297 |

* cited by examiner

*Primary Examiner* — David V Bruce
(74) *Attorney, Agent, or Firm* — Taylor Russell & Russell, PC

(57) ABSTRACT

An air-cooled light reflector apparatus for high intensity light sources typically used in indoor horticultural and agriculture applications. The reflector apparatus includes an internal reflector fixed to a curved assembly of hinged extruded sections, a unique adjustable light source mounting fixture bracket, a double-paned insulating glass window and an insulating cover enclosing the apparatus. Forced air is provided to the apparatus for cooling the light source, while the heated air is ducted externally to minimize any rise in ambient air temperature. The double-paned insulating glass and enclosing insulating cover further minimize rise in ambient air temperature. The curvature of the internal reflector provides optimal photometric characteristics.

10 Claims, 10 Drawing Sheets

HIGH INTENSITY LIGHT REFLECTOR APPARATUS

This application claims benefit of U.S. Provisional Application No. 61/051,613 filed on May 8, 2008.

FIELD OF THE INVENTION

The present invention relates generally to horticultural and agricultural lighting systems for use in growing plants indoors, and more particularly to a grow-light housing that 1) is designed for increased cooling air-flow over existing versions, 2) is insulated in two ways for the purpose of containing heat and maximizing air-cooled efficiency, 3) contains an adjustable socket so any size light source can be centered within the unit and 4) has a curved (instead of angled) design for improved photometric characteristics.

BACKGROUND

Indoor hydroponic and soil-based plant growing systems have become indispensable in the indoor horticultural industry. Each system includes and requires plant nutrient media and containers, climate control, lighting, and hydration. Large plants and those native to high intensity sunlight environments typically require high intensity lights for optimal growing conditions, so sufficient light is a major factor in indoor and greenhouse gardening. Typically, light sources requiring power input of up to 1000 watts are necessary. In most cases a light reflector is used with high power light sources to ensure that all available light is being reflected down onto the plants being grown. While these combinations do a sufficient job of replicating sunlight for the purpose of plant growth, they also produce intense heat, which is detrimental in most cases to the plants they're supporting. For this reason, tight control over temperature in the growing environment is paramount and a cooling system of some kind is necessary to prevent general rise in temperature in the growing environment. Facility-wide cooling systems may be used, but such systems are costly and, if operated to cool plants under the high intensity lights, may result in temperatures below optimum in the areas around plants housed in the same facility but under lower intensity lighting.

Since the intensity of light on any given surface is reduced by the square of the distance from the light source, the closer the light source is to the plants, the more light they are receiving. However, the closer the light source is to the plants, the hotter the plants may get. It is necessary to provide a cooling device of some kind to remove heat from the light source and allow 1) room for more lights within a given growing area without raising overall room temperatures above optimal levels and 2) the lights to be moved closer to the plant canopy to allow maximum light absorption without causing the plants harm with intense heat produced by the high intensity light sources.

It is also desirable to center a light source within a reflective housing to optimize the intensity and consistency of the light pattern beneath the reflective housing.

These lights are also used in the aquarium market with similar challenges.

SUMMARY OF INVENTION

The present invention provides improved methods and apparatus for insulating against heat escape from a reflector housing and providing improved air-cooling to indoor-gardening and aquarium lights. Its primary purpose is to improve the quality of existing cooling methods while maintaining the advantages of high intensity lighting.

The high intensity light reflector invention consists of 6 major parts that may be easily shipped unassembled and assembled in the field. These parts include the main body, reflective inserts, end caps with duct flanges, an insulated glass bottom, adjustable light source socket, and radiant-barrier insulating main body cover. The main body of the unit is horse-shoe shaped and is made of individual parts held together by suitable means. The reflective insert follows the shape of the main body and is held in place by a combination of the main body and the end caps. The end caps are affixed to ends of the main body, and include flanges to allow ducting for air to flow through the reflector apparatus. The adjustable socket is connected to the reflector main body at the apex of the horseshoe curve and is accessed through the flanges for adjustments or changes to the light source. It is designed to allow for improved air-flow over existing reflector devices and for the ability to adjust light source position within the reflector apparatus. The bottom of the reflector main body, where light is reflected down onto the plants, has supporting a sheet of double-walled insulated glass. The insulated glass allows sufficient light to reach the plants while minimizing heat escape over single-wall non-insulated glass installed on existing reflectors. The removable radiant-barrier cover is designed to fit over the top and sides of the reflector body to minimize further heat escape, resulting in a fully insulated unit.

The three primary features, including insulated glass, radiant-barrier cover, and improved air-flow design, improve the efficiency of the present apparatus over existing air-cooled reflectors. Further, the adjustable socket allows different types and sizes of light sources to be used while still allowing the light sources to be centered within the unit as desired.

Advantages of the present invention include:
1. Socket bracket is smaller and less restrictive of needed air flow than any socket bracket currently available in this market;
2. Socket bracket can be adjusted through the entire length of the hood and is not restricted to one area, allowing for more complete adjustability over existing socket brackets;
3. Insulated glass is not currently used on any hood available in the market, wherein the insulated glass restricts heat production while allowing sufficient light for plant growth;
4. The wool layer insulates against unwanted heat escape while the radiant barrier exterior reflects remaining heat back into the unit;
5. The exterior of the insulated cover is also 95% reflective of light, so the hood itself will aid somewhat in reflection of wanted light back into the growing environment;
6. The insulated cover also insulates against the undesirable roaring sound sometimes produced by the high powered duct fans used in air cooling;
7. Extruded aluminum construction is stronger than the sheet metal most hoods on the market are made of, resulting in lower manufacturing and packaging costs; and
8. Stronger construction also allows for a curved interior, which results in optimized photometric characteristics.

An embodiment of the present invention is a high intensity light reflector apparatus for fully enclosing a high intensity light source, comprising a concave main body assembly including hinged segmented longitudinal members providing an adjustable main body assembly shape for optimizing radiant light distribution, two flexible reflective inserts for being flexibly attached to adjustable interior surfaces of the main body assembly, two concave-shaped end plates, each end plate being fastened to an end of the main body assembly for maintaining a desired concave shape of the main body assembly, an insulated glass plate fastened to the bottom of the main body assembly and bottom of each end plate for providing illumination of vegetation, an adjustable light source socket holder slidably-attached to an inner apex of the concave main body assembly, and a radiant-barrier insulating cover for enclosing the main body assembly and the end plates. The hinged segmented longitudinal members may be connected together utilizing a longitudinal ball and socket hinge. Each end plate may include a flanged opening for servicing the high intensity light source and providing connection to ducting for cooling air into and from the interior of the reflector apparatus. The insulated glass plate may comprise two layers of low-e glass plate with an insulating air gap between the two layers. The adjustable light source socket holder may be longitudinally adjusted through an entire length of the longitudinal members in a socket holder slide channel at the inner apex of the concave main body assembly for centering a light source, the light source socket holder being adaptable to accommodate sockets for various light source sizes and shapes. The radiant barrier insulating cover may comprise a removable, two-layer insulating cover. The radiant barrier insulating cover may comprise a first inner insulating layer and a second outer radiant barrier. The radiant barrier insulating cover may be a sound-reducing insulating cover. The end plates may include slots for supporting the light reflector apparatus from an overhead structure. The hinged segmented longitudinal members may be extruded aluminum hinged segmented longitudinal members.

DETAILED DESCRIPTION OF PREFERRED EMBODIMENT

Figure 1:
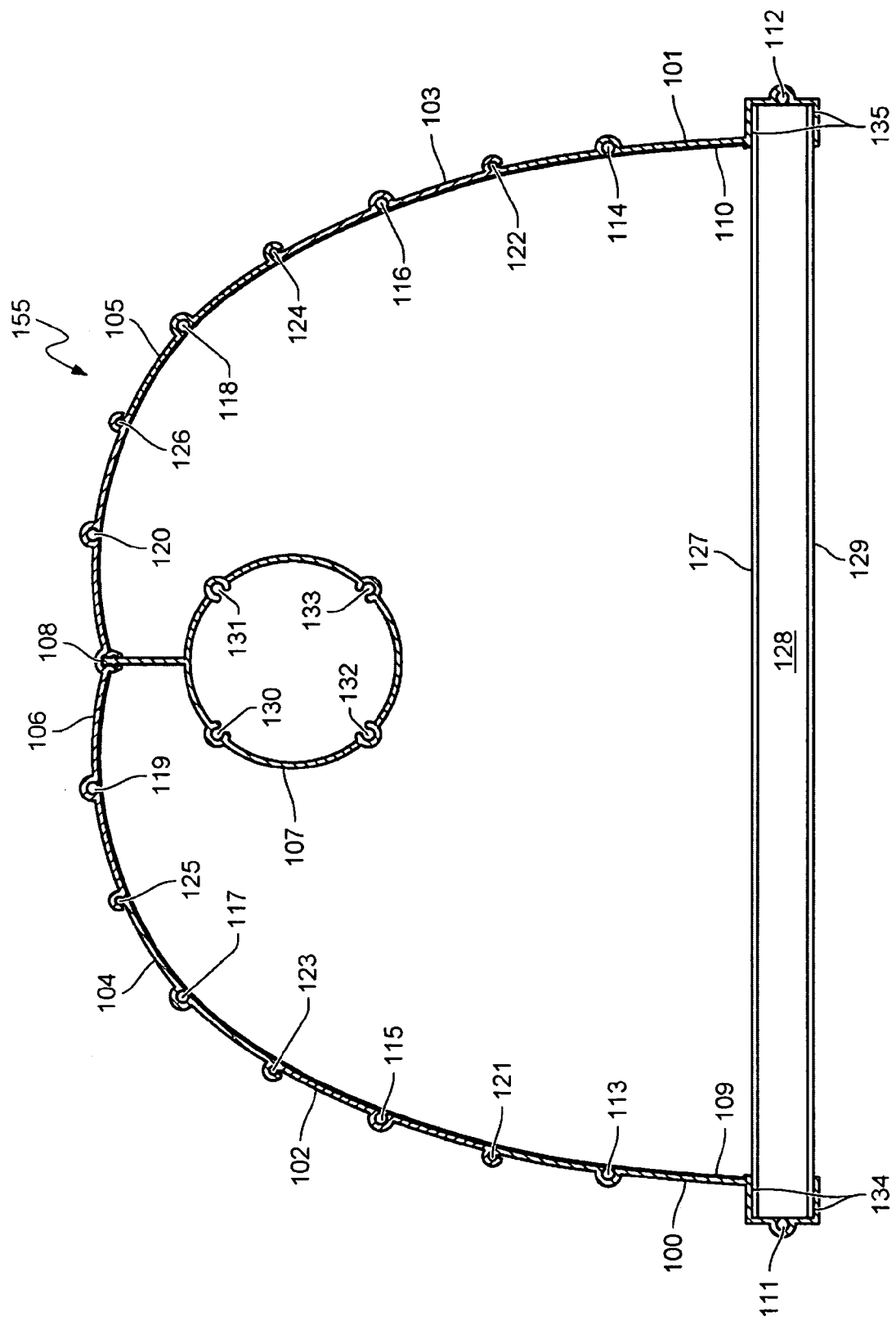
FIG. 1 is cross section view 1-1 of the main body of the light reflector shown in FIG. 6.
Figure 2:
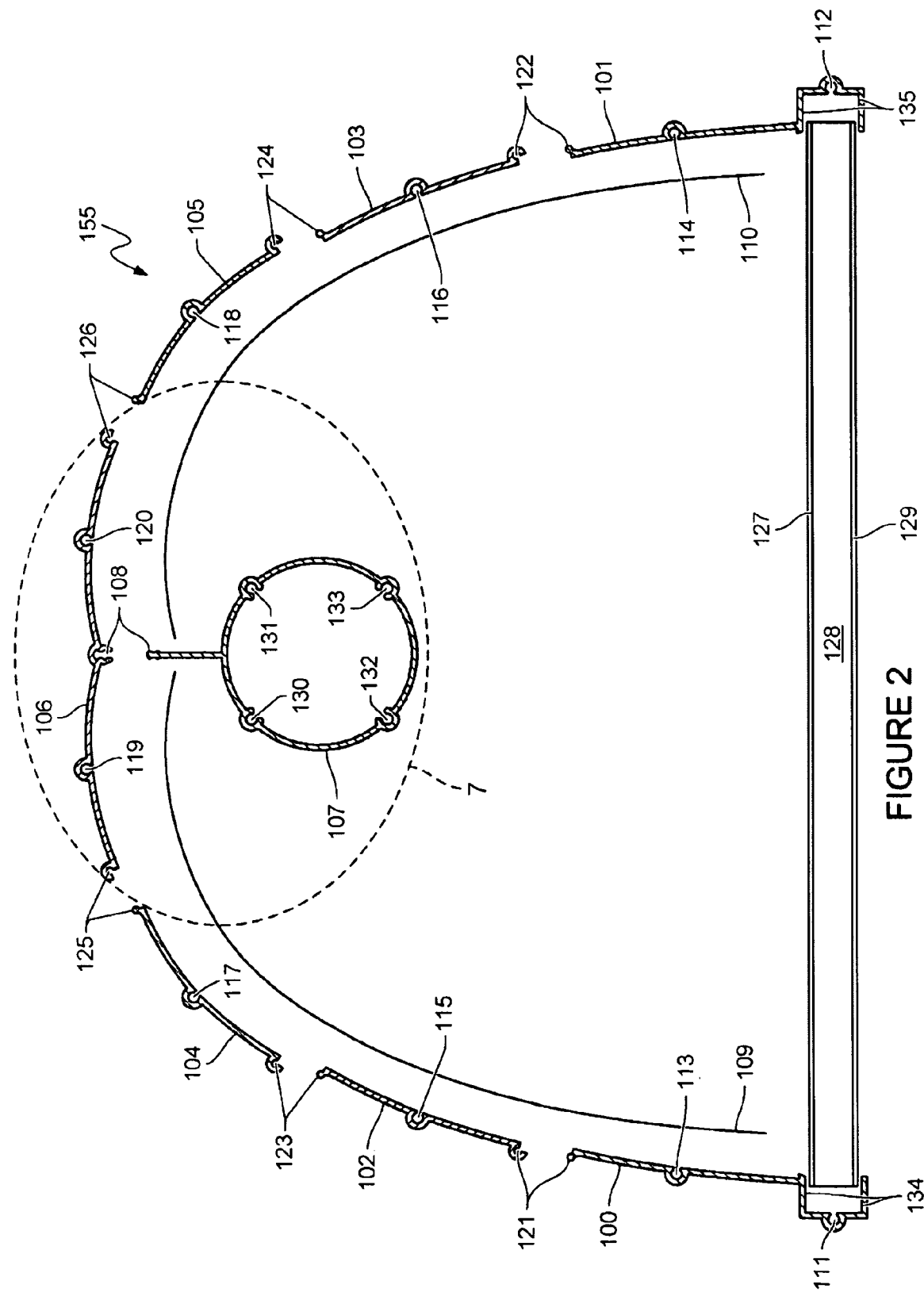
FIG. 2 is an exploded cross section view 1-1 of the main body of the light reflector, showing the reflective insert and individually extruded parts, and illustrating how they fit together.
Figure 6:
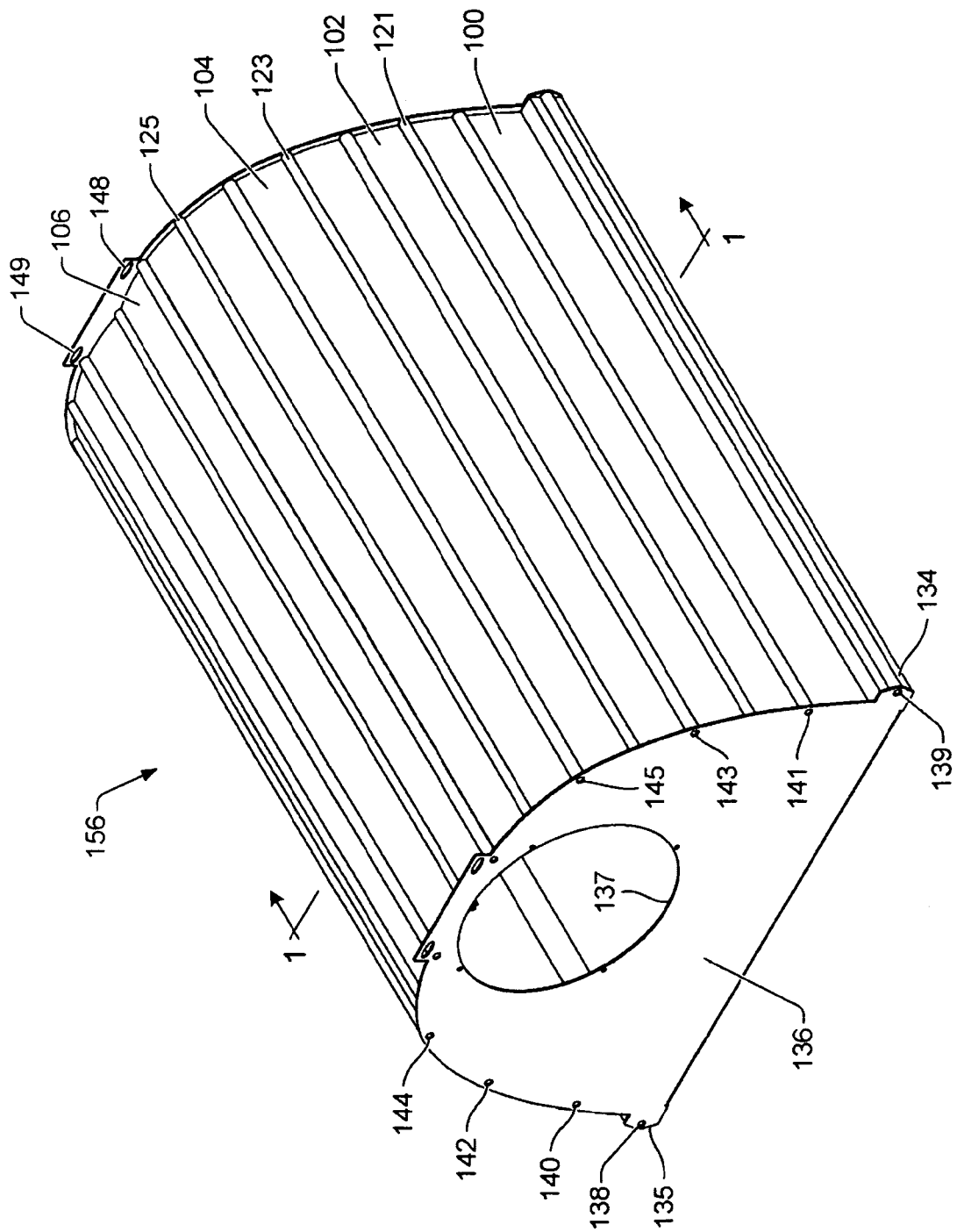
FIG. 6 is a perspective view showing a top of the assembled light reflector without the insulating cover, including cross section 1-1.

Referring to FIG. 1-FIG. 2, FIG. 1 is cross section view 1-1 of an embodiment of the main body 155 of the light reflector shown in FIG. 6, and FIG. 2 is an exploded cross section view 1-1 of the main body 155 of the light reflector, showing s reflective inserts 109, 110 and individually extruded parts 100-107, and illustrating how they fit together. Within the embodiment shown in FIG. 1-FIG. 2, components 100-107 are preferably extruded aluminum parts. They are preferably extruded individually, and assembled together with a ball and socket hinge 121-126, or similar connecting means. The ball and socket hinge allows the horseshoe shape to open outward to some degree, allowing room for the slide-in installation of the reflective insert 109-110 around the main body and the insulated glass. The insulated glass 127-129 is two pieces of low-e glass with an insulating air gap between them 127-129. The insulated glass 127-129 is positioned within the glass channel 134-135. After these parts are installed, the unit is then tightened back to its intended final shape and held together by installation of the end caps, shown in FIG. 3, with fastening devices at locations 111-120 on FIG. 1-FIG. 2 and locations 138-147 on FIG. 3. The adjustable light socket 107 is installed in a custom-fitted bracket track 108 at the apex of the reflector. The socket can be inserted at either end of the reflector and slides along the bracket track for total adjustability. There are fastener locations 130-133 in the socket bracket to allow for installation of a socket and light bulb.

Figure 3:
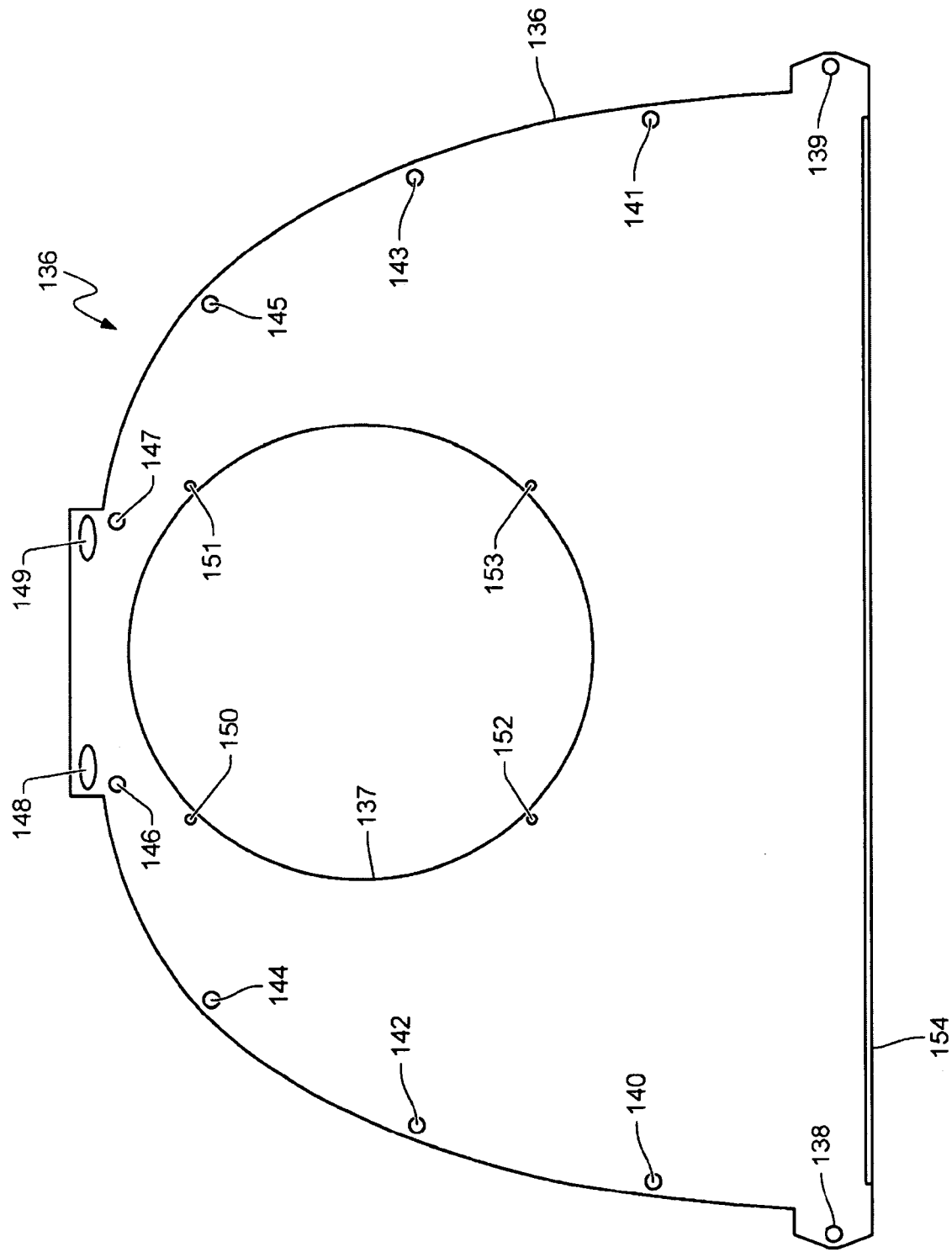
FIG. 3 is a side view of the light reflector, facing one end cap.
Figure 4:
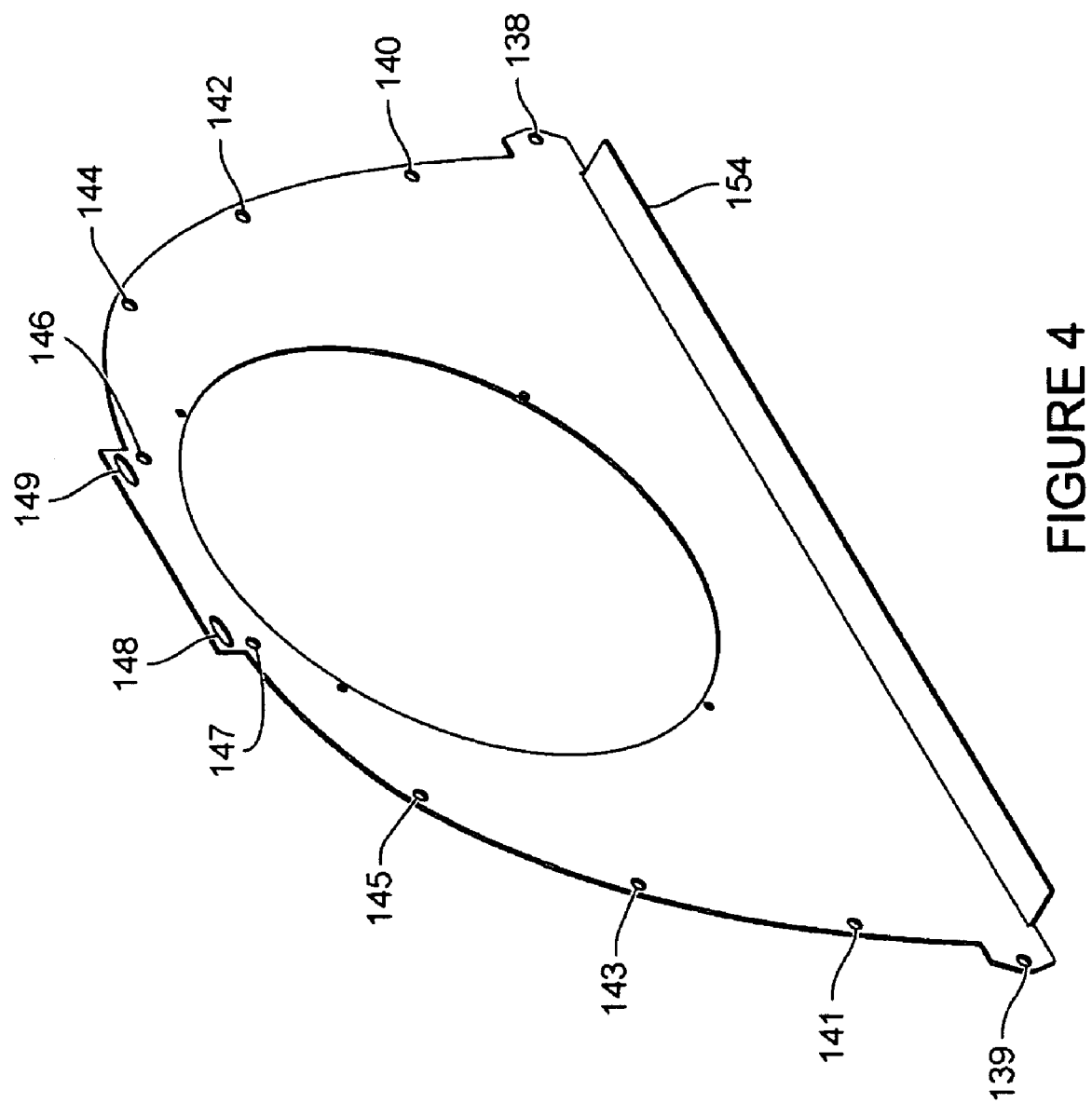
FIG. 4 is a perspective view of the interior side of an end cap.

Referring to FIG. 3 and FIG. 4, FIG. 3 is a side view of the light reflector, facing one end plate 136, and FIG. 4 is a perspective view of the interior side of the end plate 136 shown in FIG. 3. An end plate is required on each end of the light reflector. The reflector end plate 136 consists of one piece of stamped material that mimics the shape of the cross section of the main body. In a preferred embodiment of the invention, the reflector end plates 136 comprise stamped aluminum sheets. An opening 137 in the end plates 136 is provided for air ducting. There are fastener locations 138-147 for installation of the end plates 136 onto the main body 155. The fastener locations 138-147 correlate to fastener locations 111-120 on FIGS. 1-2. Fastener locations 150-153 are provided for installation of air duct flanges. Slots 148-149 are provided for a hanger bracket for hanging the unit from a ceiling or other suitable structure. A ledge 154 is provided for support of the insulated glass (127-129 on FIG. 1 and FIG. 2), made by bending the bottom portion of the end cap upward at a 90 degree angle after stamping.

Figure 5:
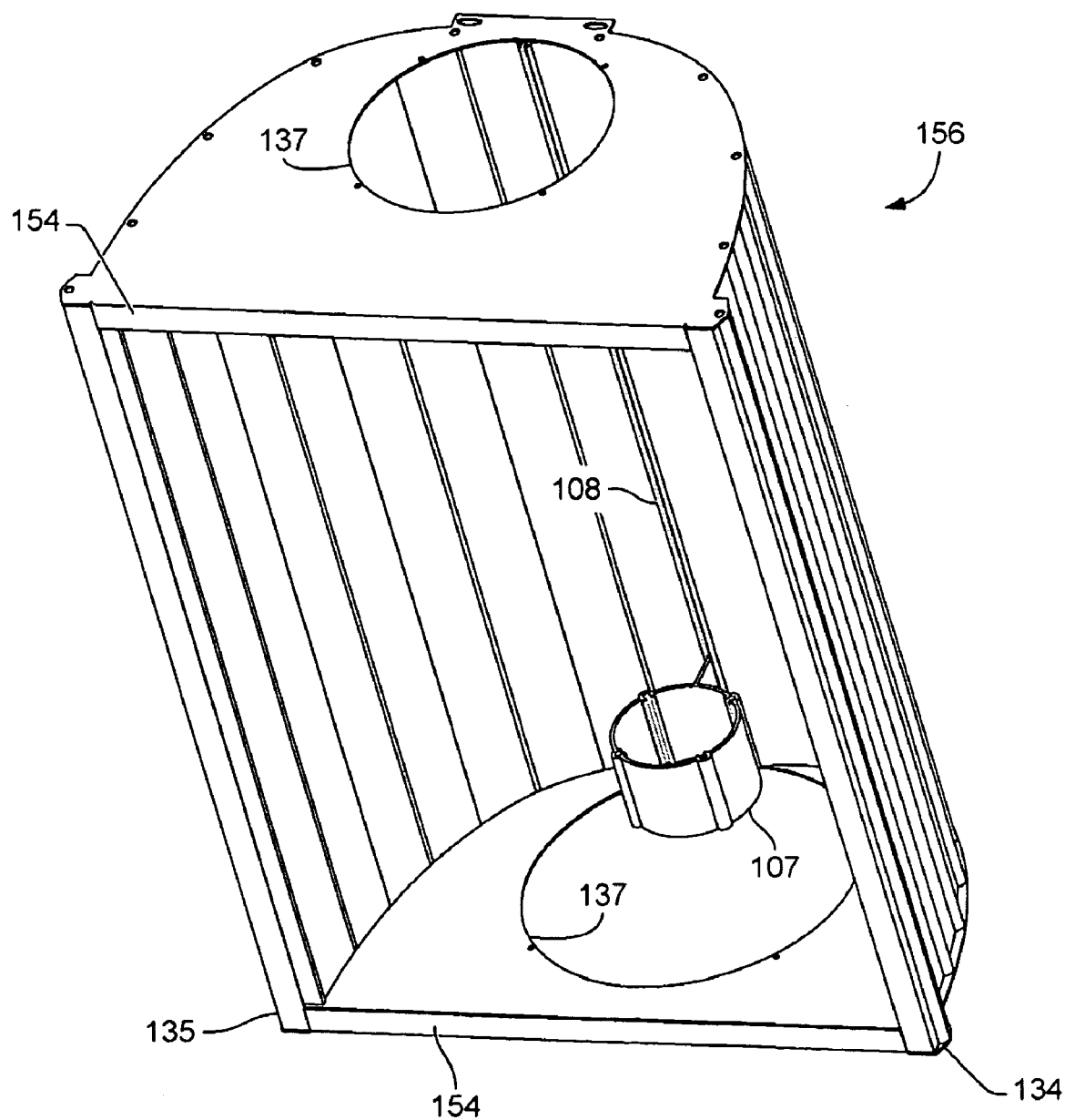
FIG. 5 is a perspective view showing a bottom of the assembled light reflector without the insulating cover.

Referring to FIG. 5, FIG. 5 is a perspective view showing a bottom of the assembled light reflector 156 without an insulating cover. This illustrates a perspective view of an embodiment of a reflector assembly 156, less a removable two-layer outer insulating blanket. This figure illustrates an adjustable socket bracket 107 and a socket slide channel 108 at the apex of the reflector assembly 156. Also illustrated in FIG. 5 are the glass channels 134, 135, support ledges 154 and air duct openings 137.

Referring to FIG. 6, FIG. 6 is a perspective view showing a top of the assembled light reflector 156 without the insulating cover, including cross section 1-1 illustrated in FIG. 1. This is a perspective view illustrates an embodiment of the reflector assembly 156, less the removable two-layer outer insulating blanket. The view is looking down at the top of the reflector assembly 156 at the outer main body 155, made up of extruded aluminum parts 100-106, connected by ball & socket hinges 121-126, and held in place by the end plates 136 with fasteners 138-145. Also illustrated are exterior views of the glass channels 134-135 and the slots for hanger brackets 148-149.

Figure 7:
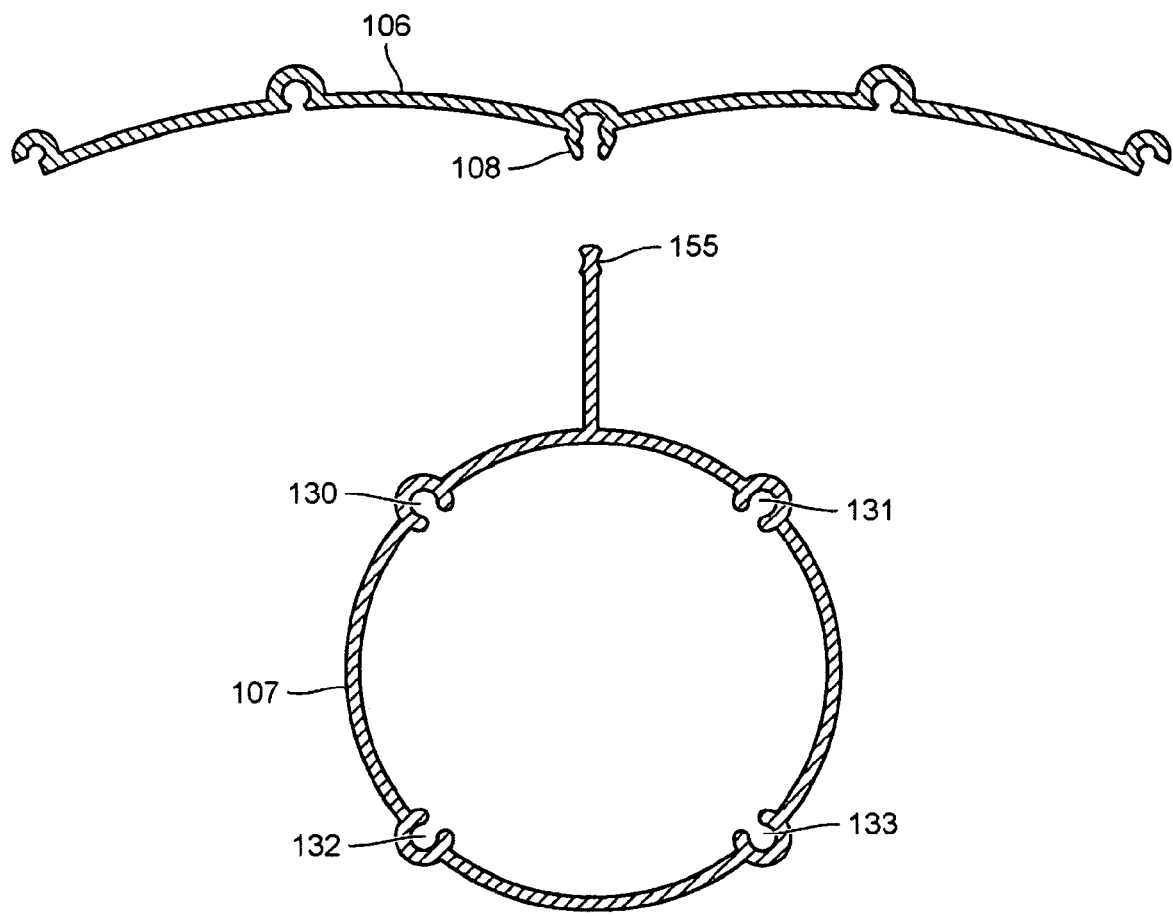
FIG. 7 is an exploded cross section view 7 from FIG. 2 showing the socket bracket and light reflector center section.

Referring to FIG. 7, FIG. 7 is an exploded cross section view 7 from FIG. 2 showing the socket bracket and light reflector center section. FIG. 7 is a cross-section detail of an adjustable socket bracket 107 and center section 106. A user-provided light bulb or light source and socket assembly are assembled into the socket bracket 107 using fasteners at fastener locations 130-133. The socket bracket 107 is installed into the reflector assembly 156 by sliding the socket bracket hanger 155 into the track 108 at either end of the reflector assembly 156. The socket bracket hanger 155 has a double-head construction that mimics the opening of the socket bracket track 108. The configuration allows the socket bracket 107 to be inserted at one end of the reflector assembly 156, removed from the other end of the reflector assembly 156, and vice versa while still allowing it to hang in place after a bulb or light source is installed.

Figure 8:
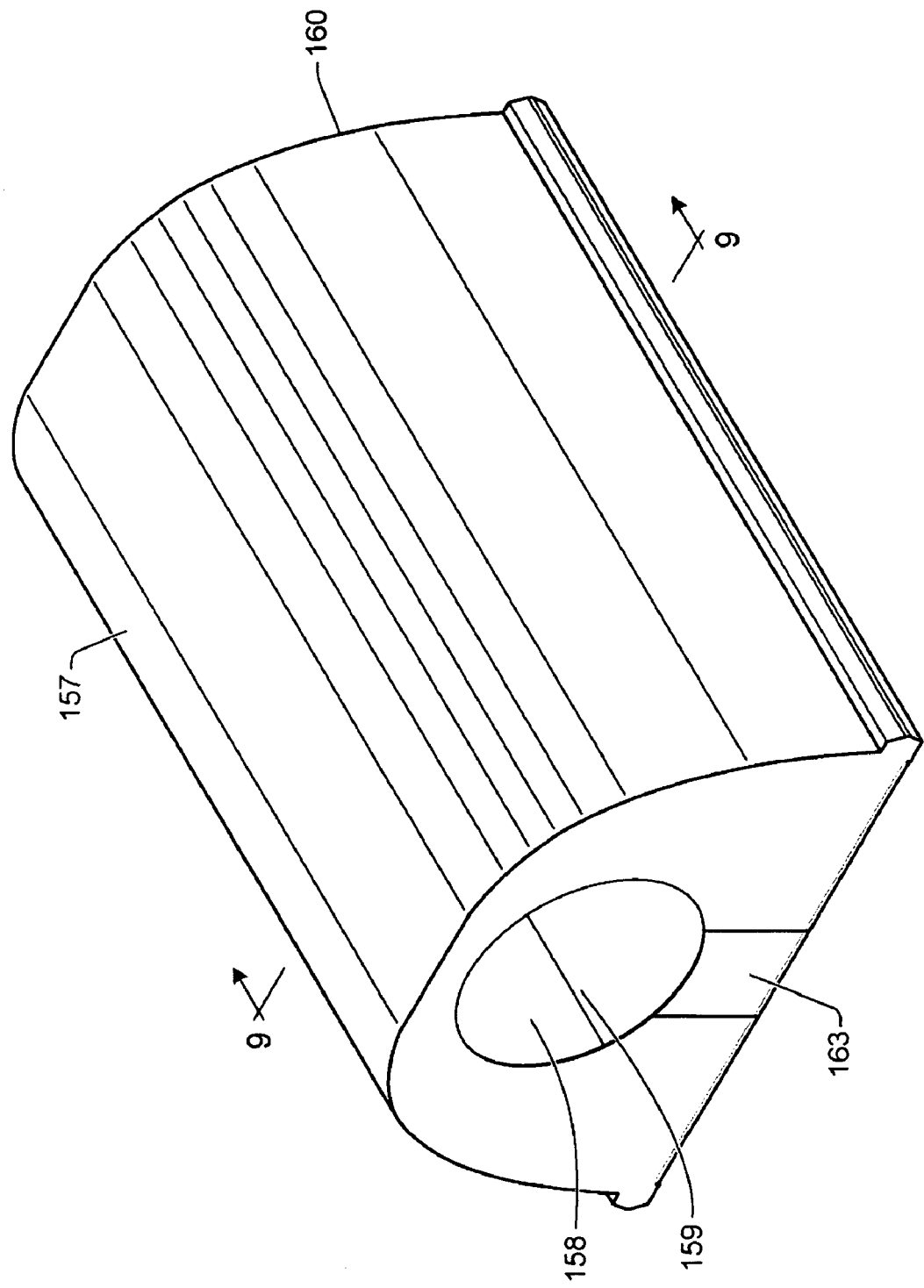
FIG. 8 is a perspective view of the insulating cover, including cross section 9-9.

Referring to FIG. 8, FIG. 8 is a perspective view of an insulating cover 160, including cross section 9-9. The cover fits over the body of the reflector and duct flanges with an opening 159 that is secured by a Velcro fastener 163. The cover works due to its two-ply construction, consisting of an inner insulating layer, preferably wool 158, and an outer radiant barrier fabric 157. The inner insulating layer is necessary for the radiant barrier to work effectively.

Figure 9:
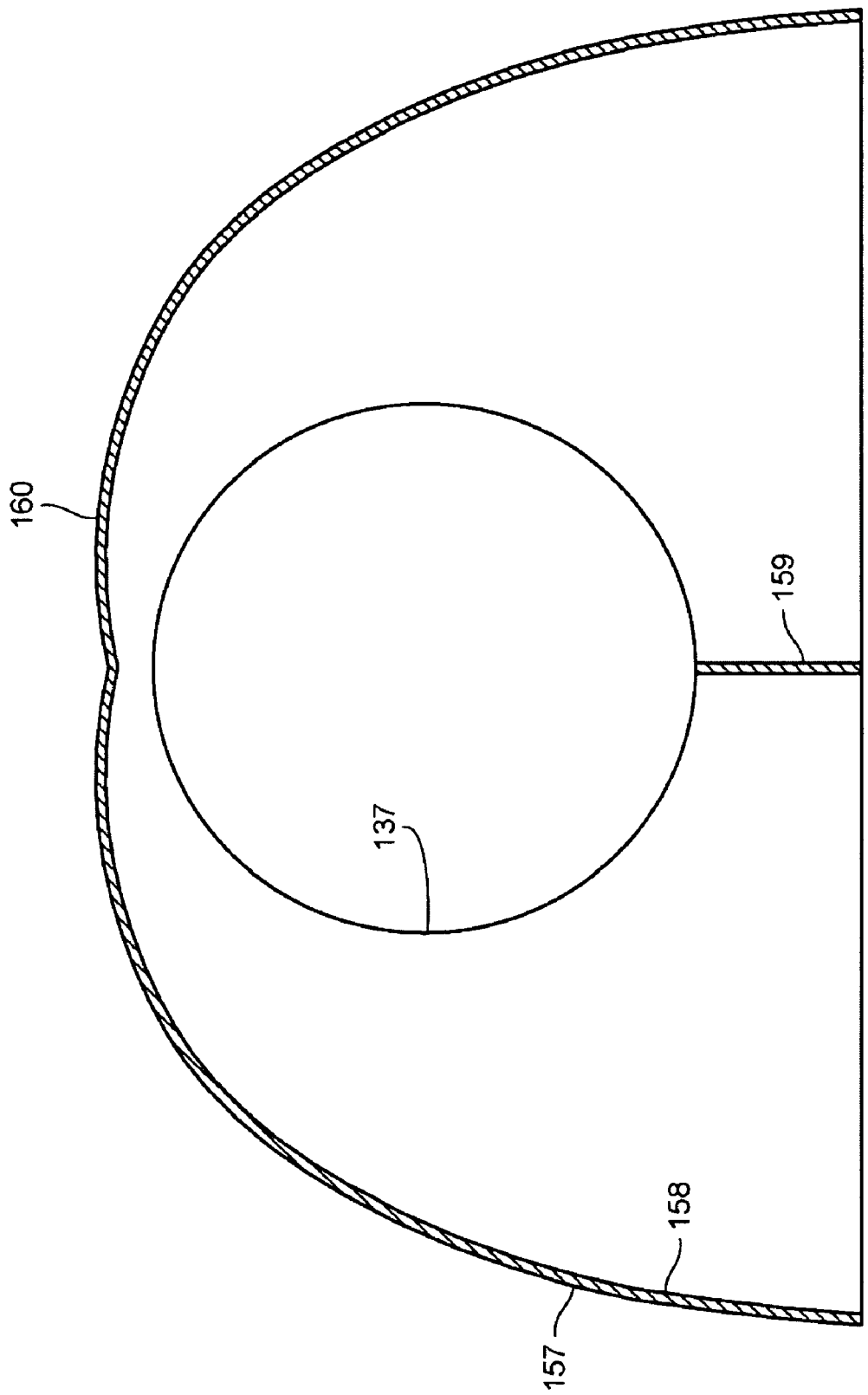
FIG. 9 is cross section view 9-9 of the insulating cover shown in FIG. 8.

Referring to FIG. 9, FIG. 9 is cross section view 9-9 of the insulating cover 160 shown in FIG. 8. The cover consists of two layers of material, the outer layer radiant barrier fabric 157 and the inner layer insulation 158. There is an opening 159 around the duct flange 137, secured by a Velcro connection (not pictured) on the outside at either end of the unit.

Figure 10:
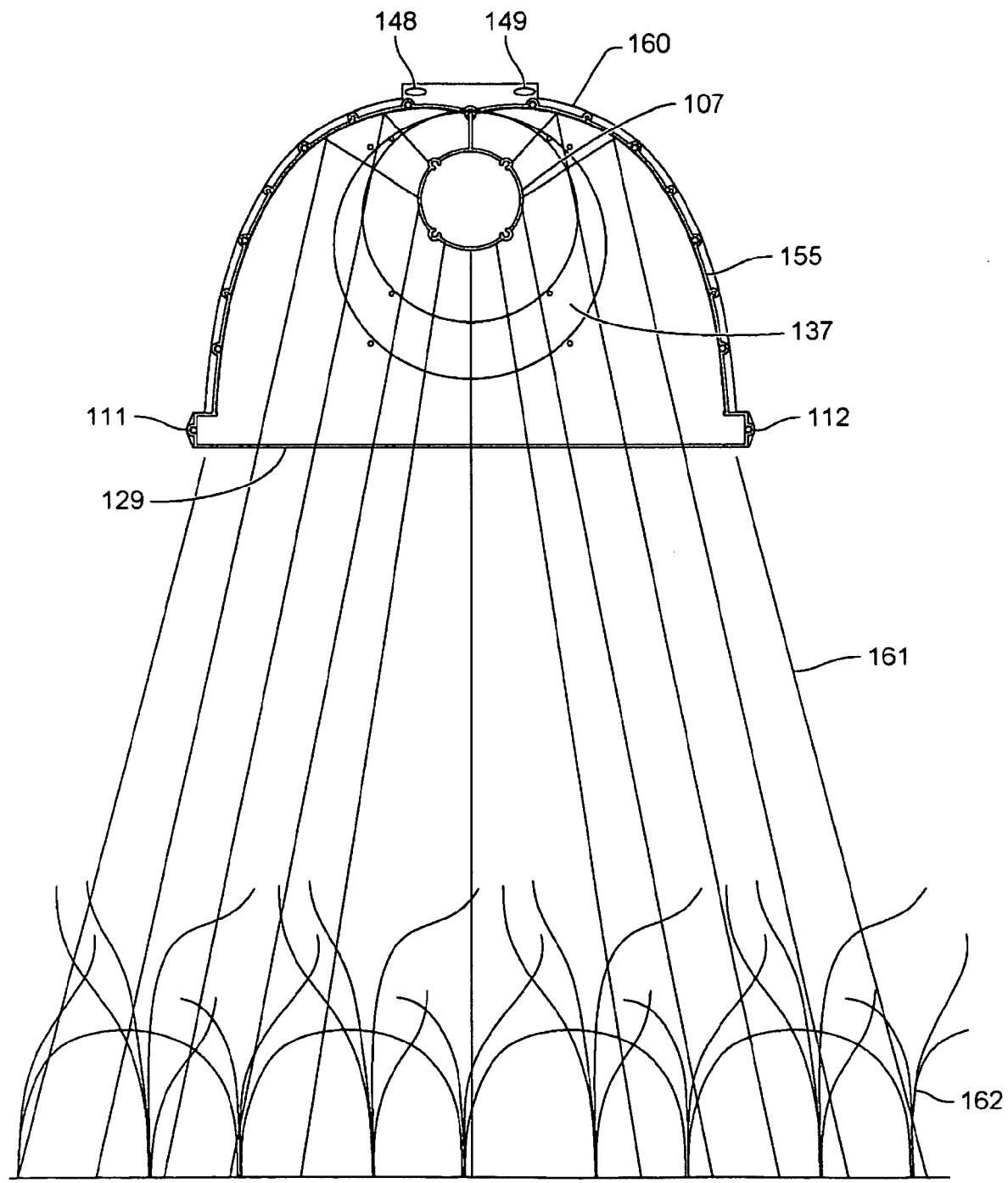
FIG. 10 shows the present invention applied to indoor horticulture.

Referring to FIG. 10, FIG. 10 shows the present invention applied to indoor horticulture. FIG. 10 illustrates a cross section illustration of the entire unit being used in a horticultural setting. The unit 155 is hung using the hanger brackets 148, 149. The light source is mounted in the socket bracket 107 and emits light 161 through the glass 129 onto plant or animal life 162 below. The insulating reflective cover 160 is installed over the unit.

Although the present invention has been described in detail with reference to certain preferred embodiments, it should be apparent that modifications and adaptations to those embodiments might occur to persons skilled in the art without departing from the spirit and scope of the present invention.

REFERENCE NUMBER DESIGNATIONS 100 extrusion section 1
101 extrusion section 1 mirror
102 extrusion section 2
103 extrusion section 2 mirror
104 extrusion section 3
105 extrusion section 3 mirror
106 center extrusion section
107 adjustable socket bracket
108 socket bracket slide channel
109 reflector material
110 reflector material mirror
111 screw channel
112 screw channel
113 screw channel
114 screw channel
115 screw channel
116 screw channel
117 screw channel
118 screw channel
119 screw channel
120 screw channel
121 ball and socket hinge
122 ball and socket hinge
123 ball and socket hinge
124 ball and socket hinge
125 ball and socket hinge
126 ball and socket hinge
127 glass
128 insulating air gap
129 glass
130 socket bracket screw channel
131 socket bracket screw channel
132 socket bracket screw channel
133 socket bracket screw channel
134 insulated glass channel
135 insulated glass channel mirror
136 reflector end plate
137 air duct opening
138 screw hole
139 screw hole
140 screw hole
141 screw hole
142 screw hole
143 screw hole
144 screw hole
145 screw hole
146 screw hole
147 screw hole
148 slot for hangar bracket
149 slot for hangar bracket
150 screw hole
151 screw hole
152 screw hole
153 screw hole
154 insulated glass ledge
155 main body
156 reflector assembly

The invention claimed is:

1. A high intensity light reflector apparatus for fully enclosing a high intensity light source, comprising:
a concave main body assembly including hinged segmented longitudinal members providing an adjustable main body assembly shape for optimizing radiant light distribution;
two flexible reflective inserts for being flexibly attached to adjustable interior surfaces of the main body assembly;
two concave-shaped end plates, each end plate being fastened to an end of the main body assembly for maintaining a desired concave shape of the main body assembly;
an insulated glass plate fastened to the bottom of the main body assembly and bottom of each end plate for providing illumination of vegetation;
an adjustable light source socket holder slidably-attached to an inner apex of the concave main body assembly; and
a radiant-barrier insulating cover for enclosing the main body assembly and the end plates.

2. The high intensity light reflector apparatus of claim 1, wherein the hinged segmented longitudinal members are connected together utilizing a longitudinal ball and socket hinge.

3. The high intensity light reflector apparatus of claim 1, wherein each end plate includes a flanged opening for servicing the high intensity light source and providing connection to ducting for cooling air into and from the interior of the reflector apparatus.

4. The high intensity light reflector apparatus of claim 1, wherein the insulated glass plate comprises two layers of low-e glass plate with an insulating air gap between the two layers.

5. The high intensity light reflector apparatus of claim 1, wherein the adjustable light source socket holder is longitudinally adjustable through an entire length of the longitudinal members in a socket holder slide channel at the inner apex of the concave main body assembly for centering a light source, the light source socket holder being adaptable to accommodate sockets for various light source sizes and shapes.

6. The high intensity light reflector apparatus of claim 1, wherein the radiant barrier insulating cover comprises a removable, two-layer insulating cover.

7. The high intensity light reflector apparatus of claim 6, wherein the radiant barrier insulating cover comprises a first inner insulating layer and a second outer radiant barrier.

8. The high intensity light reflector apparatus of claim 6, wherein the radiant barrier insulating cover is a sound-reducing insulating cover.

9. The high intensity light reflector apparatus of claim 1, wherein the end plates include slots for supporting the light reflector apparatus from an overhead structure.

10. The high intensity light reflector apparatus of claim 1, wherein the hinged segmented longitudinal members are extruded aluminum hinged segmented longitudinal members.

* * * * *